Feb. 16, 1932.                G. BUTTFIELD                    1,844,942
                     APPARATUS FOR CONTROLLING HUMIDITY
                         Filed June 27, 1929      2 Sheets-Sheet 1
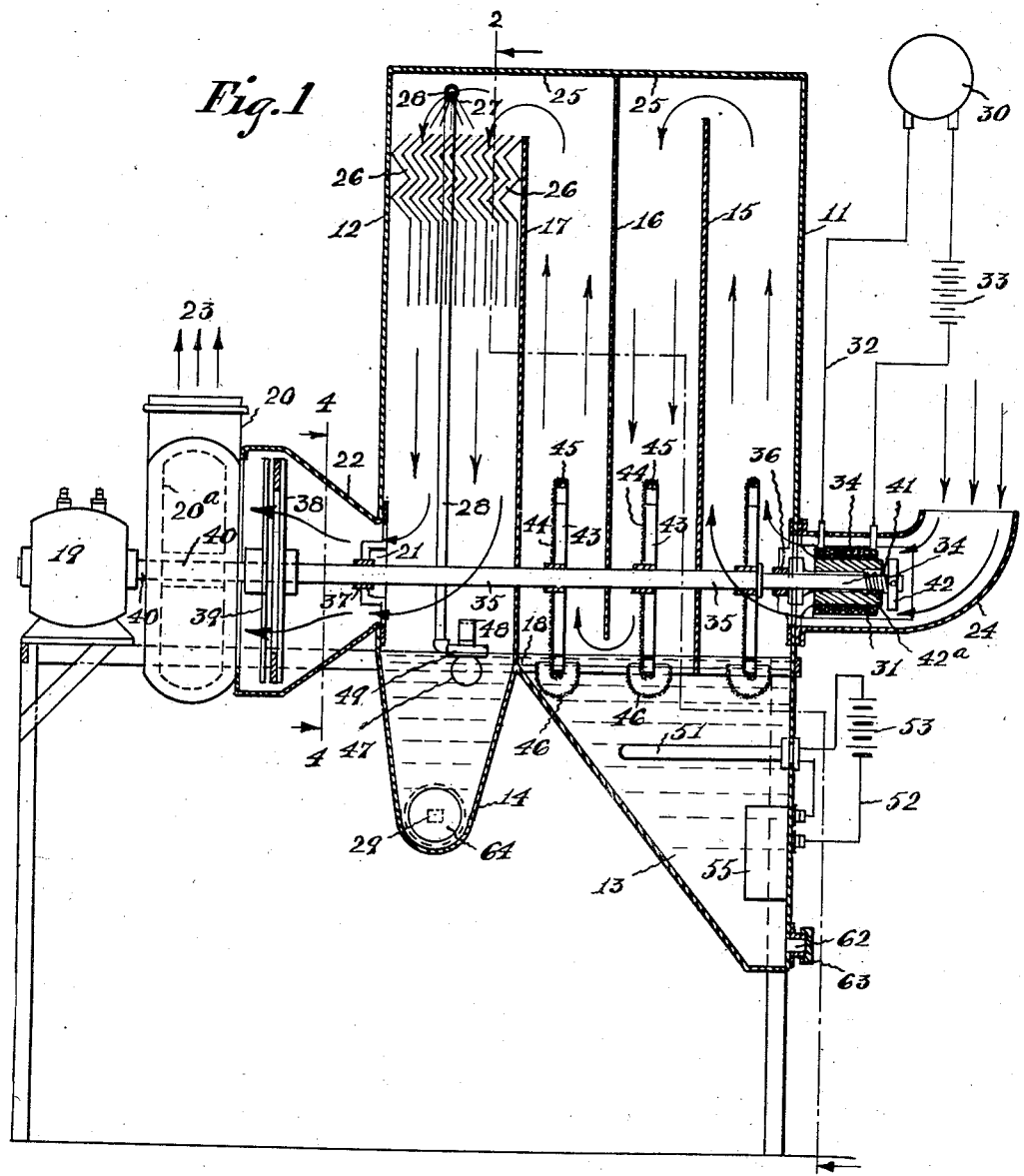
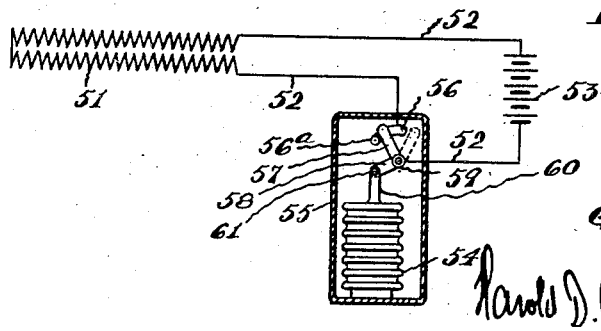
INVENTOR
Gibson Buttfield,
BY
Harold D. Penney ATTORNEY Feb. 16, 1932. G. BUTTFIELD 1,844,942
APPARATUS FOR CONTROLLING HUMIDITY
Filed June 27, 1929 2 Sheets-Sheet 2
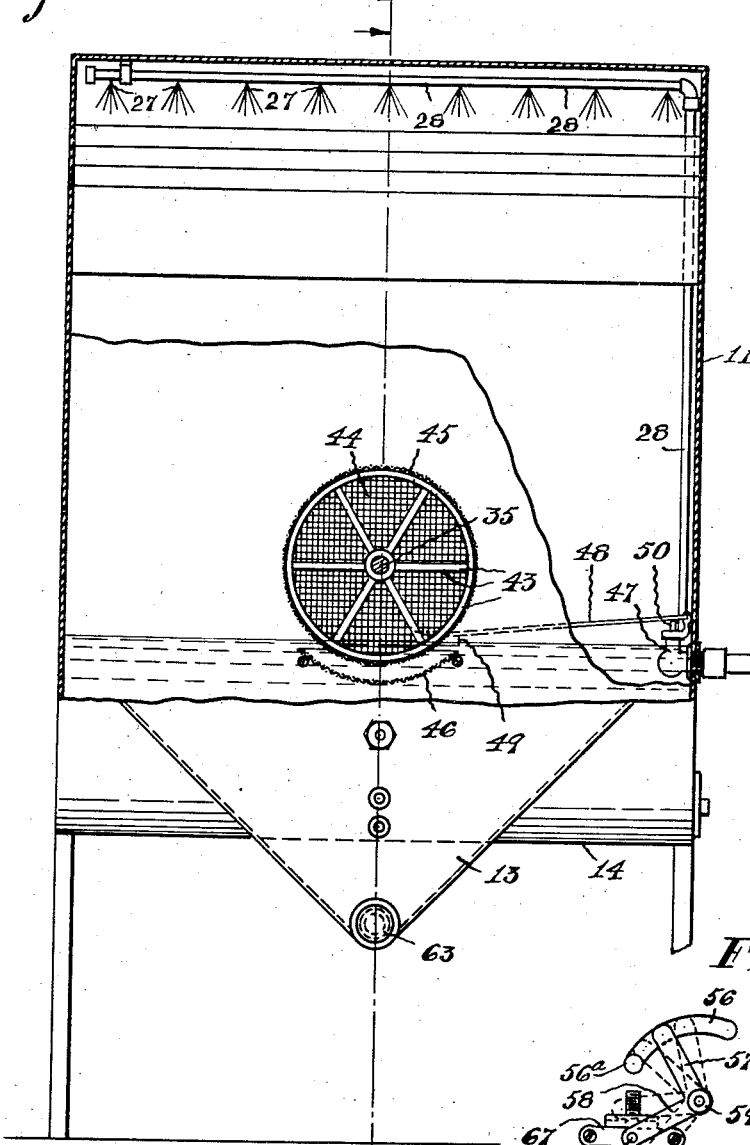
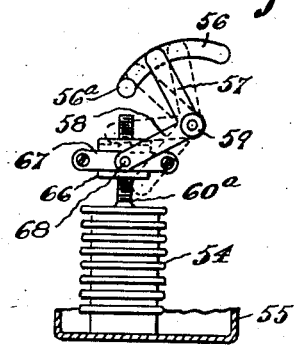
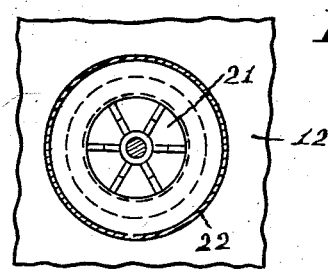
INVENTOR
Gibson Buttfield,
BY
Harold D. Penney ATTORNEY Patented Feb. 16, 1932

1,844,942

UNITED STATES PATENT OFFICE

GIBSON BUTTFIELD, OF PLAINFIELD, NEW JERSEY

APPARATUS FOR CONTROLLING HUMIDITY

Application filed June 27, 1929. Serial No. 374,224.

My invention relates to a humidity controlling apparatus, and it consists in the novel features, which are hereinafter described.

One of the objects of my improvement is to provide a humidity controlling apparatus, which is automatically influenced by a humidostat through electrical connections provided for that purpose.

Another object of my improvement is to provide a humidity controlling apparatus, which may not raise the temperature of the air current passing therethrough, whereby said apparatus may be used during comparatively warm weather, when no heating of the room is desirable.

A further object of my improvement is to provide an improved, preferably electrically controlled, humidity controlling apparatus, which is continually in operation normally supplying a moderate quantity of moisture to the air of a room or rooms, and, when called on by the action of a suitable humidostat, automatically to supply an additional quantity of moisture to the air.

Another object of my improvement is to provide said humidity controlling apparatus with an automatic electric means for heating the water of the said apparatus to a predetermined temperature, thereby rendering more regular the action of the apparatus by keeping the said normal degree of humidification constant during a considerable length of time.

A further object of my invention is to provide a means for adjusting said normal degree of humidification from time to time by adjusting a part of my apparatus which controls the temperature of the water employed in the apparatus.

A further object of my invention is to prevent a violent commotion of the water in said apparatus when the latter is suddenly called upon to produce comparatively large quantities of moisture.

Another object of my invention is automatically to keep the water in said apparatus at a fairly constant level.

A further object of my improvement is to provide dust removal means, whereby the passing air may be scoured or scrubbed while passing through the said apparatus, and, further, to provide means for the removal of dust sludge from the apparatus from time to time.

Another object of my improvement is to have said apparatus compact, simple, durable and comparatively inexpensive.

Other objects and advantages will hereinafter appear.

I attain these objects by the humidity controlling apparatus, one form of which is illustrated in the accompanying drawings or by any mechanical equivalent or obvious modification of the same.

In the drawings,

Fig. 1 is a vertical section on the line 1—1 of Fig. 2, looking in the direction of the arrows;

Fig. 2 is a vertical section on the broken line 2—2 of Fig. 1;

Fig. 3 is a detail in vertical section of an automatic water heating device which forms part of my apparatus;

Fig. 4 is a detail in vertical section through the passage leading from the air washing chamber of said apparatus, which is hereinafter described, to the intake of the exhaust fan or blower, the section being on the line 4—4 of Fig. 1 looking in the direction of the arrows;

Fig. 5 is a fragmentary detail view in elevation of a modification of the switch controlling means of the water heating means of my apparatus, which is hereinafter described.

Like numerals refer to like parts throughout the several views:

11 designates a humidifying compartment and 12 an air washing or dust removing compartment of my humidity controlling apparatus; the former contains at the lower end thereof a water tank 13, and the latter terminates at the lower end thereof in a water tank 14. Both tanks are hopper-shaped as shown. Vertical curtain baffle walls or incomplete partitions 15 and 16 are placed in the humidifying chamber for a purpose, which is hereinafter described, and a similar baffle 17 is employed to partly separate the said two compartmens from each other.

An aperture 18 at the foot of said wall 17 and at the junction of the latter with said tanks 13 and 14 permits water to flow from either of said tanks into the other, thereby maintaining an equal level therein.

A motor 19, positioned in the rear of the apparatus, is employed to actuate an exhaust from the impeller 20ª of which is enclosed in a casing 20, shown in Fig. 1, continually to exhaust air passing through the said compartment 11 and 12 through an opening 21 in said compartment 12 and an intake casing 22 of said fan.

The arrows at 23 show the direction of the flow of air from the discharge end of said casing 20 into the room.

An air intake elbow 24 is employed, as in Fig. 1, for conducting air into the said compartment 11 of the apparatus; said intake may be located in a space or chamber which has a regulated communication both with the air in the room or rooms and with the outside air, admitting air from either of these sources or from both of them in any required proportions. The valves and ducts employed for this purpose may be of any standard design, and are not shown in the drawings of this application.

A current of air passes from the said intake at 24 into the said compartment 11 and comes into contact with the surface of the water in said tank 13, rises upwardly in the space in front of said first baffle 15, passes over said curtain wall 15, is deflected by the roof 25 of the apparatus downwardly into the space between baffles 15 and 16, contacts with the water again in said tank 13, is then deflected upwardly into the space between said baffles 16 and 17, thereby completing a path resembling the shape of the letter S, and passes over baffle 17 into said compartment 12, where said current is deflected again by said roof 25 and passes through a system of minor baffle plates 26, whereon it comes in contact with an air scrubbing and humidifying arrangement in the form of a spray of water which is discharged downwardly from a series of orifices 27 in water spray a pipe 28 which is positioned above said plates 26; said water removes the dust from said current of air and carries it down into the said tank 14, from which it may be periodically discharged as mud by means of a blow off 29 at the lower end of said tank 14, into which said dust or sludge settles down by gravity.

The current of air from said compartment 12 passes through said opening 21 and the interior of said intake casing 22 into contact with the impeller 20ª of said exhaust fan, which is enclosed by said casing 20, and from the latter into the room, after having absorbed a normal quantity of moisture from the water in said tank 13, wherein a constant predetermined temperature is maintained by an automatic device, which is hereinafter described.

To supply additional moisture to the said current of air when needed I provide a standard type of humidostat 30 and a solenoid 31, which is electrically connected by means of a circuit 32 to a source of electrical energy 33', a suitable switch in said circuit 32 is controlled by said humidostat 30, whereby said solenoid 31 is actuated only when there is a deficiency of moisture in the air of the room as determined by said humidostat 30, and is inactive when there is no such deficiency.

The core 34 of said solenoid 31 is shown as secured or coupled to one end of a shaft 35, which is horizontally positioned; both said core 34 and said shaft 35 are slidably supported by suitable bearings 36 and 37, which are shown in Fig. 1; said bearings permit said shaft 35 and said core 34 to slide lengthwise thereof.

The other end of said shaft 35 has secured thereto one part 38 of a two part friction clutch 38—39; the other part 39 of said clutch is secured to the shaft 40 of said motor 19 and the impeller 20ª of said exhaust fan 20ª—20.

Said shafts 35 and 40 are positioned in line with each other; the outer end of said core 34 has thereon a collar 42 to receive the thrust of one end of a compression spring 41; a washer may be interposed between said spring 41 and said collar 42, if desired. The other end of said spring 41 is abutting against a shoulder, which is formed in a recess of a brass tube 42ª, which is stationary and positioned coaxially with said core 34; said spring 41 is initially stressed to draw said core 34 and said shaft 35 towards the right in Fig. 1, thereby keeping said parts 38 and 39 of said clutch 38—39 out of contact with each other, the action of the solenoid 31, under the influence of said humidostat 30, moves said core 34 and shaft 35 towards the left in Fig. 1, against the force of said spring 41, thereby bringing said parts 38 and 39 into engagement with each other and thereby causing said shaft 35 to be actuated by said motor 19.

Said shaft 35 has secured thereto wheels 43, mounted to revolve in vertical planes, and each of said wheels 43 has secured thereto a perforated disk 44, which may be made of wire screen, to revolve in a vertical plane; the peripheries of said wheels 43 also have secured thereto perforated bands or tires 45 preferably of wire screens, to revolve with said wheels 43; the lower parts of said wheels are shown in Figs. 1 and 2 as extending into the water in said tank 13, thereby raising some water, when said wheels are being revolved by said shaft 35, and atomizing the same, whereby the humidification of the current of air passing through said compartment 11 is further amplified, in addition to its normal humidification as hereinbefore described.

To prevent too violent a commotion of the water in said tank 13 when said spray wheels 43 are revolving, I provide perforated segmental shallow troughs 46, preferably of wire screen, to envelop the lower parts of said wheels 43, whereby the effect of the circulatory motion of the latter is restricted to a comparatively small area and volume of water.

When the air in the room or rooms becomes sufficiently humidified, the solenoid 31 is automatically disconnected from the source of electrical energy 33 by the humidostat 30, and the shaft 35 with the core 34 are drawn by said spring 41 to the right in Fig. 1, thereby disengaging said parts 38 and 39 of said clutch 38—39 from each other, and thereby disconnecting said shaft 35 with said wheels 43 thereon from said motor 19, whereupon the above described additional humidification is discontinued and only the hereinbefore described normal humidification is allowed to proceed.

The supply of water to said tank 13 through said pipe 28 is controlled by a whistle valve 47, which is shown in Fig. 2 as having its stem 50 connected by means of a rod 48 to a float 49 in such a way that the rising of said float 49 tends to close said valve 47 and the dropping of said float 49 tends to open said valve, whereby the water in said tank 13 may be maintained at a substantially constant level.

To maintain the water in said tank 13 at a constant temperature, when so desired, for any desired length of time I provide an automatic water heater, which comprises an electric furnace element 51, which is connected by means of an electric circuit 52 to a source of electric energy 53; a thermostat, comprising a corrugated expansion element 54 enclosed in a casing 55, has thereon a switch 56—57, consisting of a fixed slide or bar 56, having thereon a stop 56ª, and a contact arm 57, which is carried by a bell-crank lever 57—58, which is pivotally connected to said casing at 59 and to a stem 60 on said corrugated tube 54 at 61.

In the position shown in Fig. 3 the furnace element 51 is receiving electric energy from said source 53, thereby heating the water in said tank 13; when the temperature of said water reaches or exceeds a certain point said contact arm 57 reaches the position shown in dotted lines in Fig. 3, thereby opening said switch 56—57 and disconnecting said furnace element 51 from said source 53.

In a similar way a dropping or reduction of the temperature of said water below said point will cause said sylphon tube to close said switch 56—57, thereby connecting said furnace element 51 to said source 53; said stop 56ª will keep said switch closed during any further drop in temperature of said water, thereby maintaining the temperature of said water at a substantially constant point or height for any desired length of time or season. In this way a normally uniform rate of humidification is maintained in the apparatus as hereinbefore described.

To change the temperature of the water in said tank 13 from time to time during different seasons of the year or for widely different conditions of the weather, I provide a modification of the switch controlling means, which is shown in Fig. 5, and in which the stem 60ª of the corrugated tube 54 is threaded, to receive a nut 66, which has thereon a groove; a strap 67 is swivelled in said groove, and may consist of two sections; secured to each other by rivets; a pin 68 may be employed on said strap 67 for pivotally connecting thereto said arm 58 of said bell crank lever 57—58.

It is evident that, by adjusting the position of said nut 66 and said stem 65, the contact of said arm 57 with said bar 56 may be either hastened or delayed, thereby changing the action of said electric heater and thereby also changing the temperature of the water in said tank 13.

The said corrugated expansion tube or element may be of standard design and filled with a suitable chemical or gas, such as ethyl chloride.

To discharge from said tank 13 any sludge, which may pass into it from said tank 14, I provide on the lower end of said tank 13 a drain 62, which may be opened from time to time by removing therefrom the cap 63, which is normally closed.

A similar cap 64 may also be provided for a similar drain 29 on said tank 14.

When no humidification is to be done said intake 24 may be connected to said fan 20ª—20 by means of a by-pass which is not shown, and said motor 19 and fan employed for ventilation.

Many changes may be made in the details of my humidity controlling apparatus without departing from the main scope of my invention and parts of my invention may be used without other parts.

I do not, therefore, restrict myself to the details as shown in the drawings, but I intend to include also all mechanical equivalents and obvious modifications of the same within the scope of my invention.

I claim as my invention and desire to secure by Letters Patent:

1. In a humidity controlling apparatus a compartment, adapted for passage of air therethrough, a means for inducing the flow of said air, a rotary atomizer, a motor, for actuating the same, a means for rotatably connecting said atomizer to said motor, whereby to rotate the former, a source of electric energy, an electric circuit, for actuating said connecting means by energy from said source, and a humidostat, for making and breaking said circuit, thereby rotatably connecting and disconnecting said atomizer to and from said motor, whereby said atomizer may be intermittently rotated and, whereby the humidity of the air may be maintained at any desired saturation-point.

2. In a humidity controlling apparatus a compartment adapted for passage of air therethrough, a means for inducing the flow of said air, a means for maintaining a body of water in said compartment having the surface thereof exposed to said current, a means for directing said current into contact with said surface for producing thereby a normal amount of humidification of said air, an intermittently acting atomizer associated with said body of water and a humidostat for controlling the action of said atomizer, electrically connected thereto, whereby additional humidity may be imparted to said current of air, whereby the humidity of the air may be maintained at a controlled point.

3. In a humidity controlling apparatus, a compartment adapted for the passage of air therethrough, a motor driven fan for inducing the flow of said air, a means for imparting a normal degree of humidity to said air, a shaft, for maintaining the impeller of said fan thereon, intermittently acting atomizers in said compartment, a shaft, for actuating said atomizers, a two part clutch, for detachably coupling said shafts to each other, and a humidostat, for controlling the engagement of said parts to each other, whereby said atomizers may be intermittently actuated to supply additional humidity to said air.

4. In a humidity controlling apparatus, a compartment adapted for the passage of air therethrough, a motor driven fan, for inducing the flow of said air through said compartment, a means for imparting a normal degree of humidity to said air, a shaft, for maintaining the impeller of said fan thereon, intermittently acting atomizers in said compartment, a shaft for actuating said atomizers, a two part clutch, for detachably coupling said shafts to each other, thereby actuating said atomizer shaft, an automatic means, for normally keeping said parts disengaged from each other, a solenoid, for engaging said parts to each other in opposition to the force of said automatic means, and a humidostat, for controlling the action of said solenoid, whereby said atomizers may be intermittently actuated to supply additional humidity to said air.

5. In a humidity controlling apparatus a compartment adapted for the passage of air therethrough, a motor driven fan, for inducing the flow of said air through said compartment, a means for imparting a normal degree of humidity to said air, a shaft, for mounting the impeller of said fan thereon, intermittently acting atomizers in said compartment, a shaft for actuating said atomizers, a two part clutch, for detachably coupling said shafts to each other, thereby actuating said atomizer shaft, a resilient means, for normally keeping said parts disengaged from each other, a solenoid, for engaging said parts to each other in opposition to the force of said resilient means, and a humidostat, for controlling the action of said solenoid, whereby said atomizers may be intermittently actuated to supply additional humidity to said air.

6. In a humidity controlling apparatus a compartment adapted for the passage of air therethrough, a motor driven fan, for inducing the flow of said air through said compartment, a means for imparting a normal degree of humidity to said air, a shaft, for maintaining the impeller of said fan thereon, intermittently acting atomizers in said compartment, a shaft, for actuating said atomizers, a two part clutch, for detachably coupling said shafts to each other, thereby actuating said atomizer shaft, a spring, for normally keeping said parts disengaged from each other, a solenoid, for engaging said parts to each other against the force of said spring, and a humidostat, for controlling the action of said solenoid, whereby said atomizers may be intermittently actuated to supply additional humidity to said air.

7. In a humidity controlling apparatus a compartment adapted for the passage of air therethrough, a means for inducing the flow of said air, an open water container in said compartment having the surface of its water in contact with said air, one or more disc atomizers, revolvably mounted in said compartment with parts of their peripheries immersed in said water, intermittently to humidify said air, and perforated shallow troughs in said water, positioned to envelope said immersed parts, thereby preventing a violent commotion of the water in said tank by the motion of said atomizers.

8. In a humidity controlling apparatus a compartment adapted for the passage of air therethrough, a means for inducing the flow of said current, an open water container in said compartment, having the surface of its water in contact with said air, whereby a normal degree of humidification of said air is produced, an intermittently acting means for supplying additional humidity to said air, an electric heater for said water, a source of electric energy, a circuit, for connecting said heater to said source, a switch in said circuit, a lever for opening and closing said switch a corrugated tube thermostat in said water, for automatically actuating said lever, whereby to maintain a normally uniform rate of humidification, a threaded stem on said corrugated tube, a nut in engagement with said stem, a strap, swivelled on said nut and pivotally connected to said lever, whereby the action of said lever may be adjusted from time to time to change the temperature of said water thereby changing the said normal rate of humidification according to the season of the year and the condition of the weather.

9. In a humidity controlling apparatus, a compartment adapted for the passage of air therethrough, means for inducing the flow of said air, an open water container in said compartment, having the surface of its water in contact with said air, means for directing said current into contact with said surface whereby a normal degree of humidification of said air is produced, an intermittently acting automatic means for supplying additional humidity to said air, and an intermittently acting automatic heating means for automatically maintaining the temperature of said water constant for any desired length of time whereby the normal rate of humidification may be maintained substantially constant.

10. In a humidity controlling apparatus, a compartment adapted for the passage of air therethrough, means for inducing the flow of said air, an open water container in said compartment, having the surface of its water in contact with said air, and means for directing said current into contact with said surface whereby a normal degree of humidification of said air is produced, an intermittently acting automatic means, for supplying additional humidity to said air, an electric heater for intermittently automatically supplying heat to said water, and a thermostatic means, for controlling the action of said heater, thereby maintaining a constant temperature in said water, whereby the normal rate of humidification may be maintained substantially constant.

11. In a humidity controlling apparatus, a compartment adapted for the passage of air therethrough, means for inducing the flow of said air, an open water tank in said compartment, having the surface of its water in contact with said air, substantially vertical curtain walls in said compartment disposed for directing said air in a sinusoidal path into contact with said surface, whereby a normal degree of humidity is imparted to said air, an intermittently acting motor driven atomizer, and an automatic means for rotatably connecting said motor to said atomizer, thereby intermittently augmenting said humidity.

12. In a humidity controlling apparatus, a compartment adapted for the passage of air therethrough, means for inducing the flow of said air, an open water tank in said compartment having the surface of its water in contact with said air, substantially vertical curtain walls in said compartment disposed for directing said air in a path having the shape of the letter S into contact with said surface whereby a normal degree of humidity is imparted to said air, an intermittently acting motor driven atomizer, an automatic means for rotatably connecting said motor to said atomizer thereby intermittently augmenting said humidity, and a compartment containing an air washing means located in the path of movement of said air and in communication with the said first named compartment at the discharge end of the latter whereby said air may be washed after said humidifying operation has been completed.

13. In a humidity controlling apparatus a compartment adapted for the passage of air therethrough, a means for inducing the flow of said air, a rotary atomizer, a support therefor, a motor, automatic electric means for moving said support and atomizer axially toward said motor for intermittently rotatably connecting said motor to said atomizer, whereby to rotate the latter, said electric means also controlling the operation of said connecting means, thereby regulating the action of said atomizer, whereby the latter is intermittently rotated, and whereby the humidity of the air may be maintained at a constant saturation point.

14. In a humidity controlling apparatus a compartment adapted for the passage of air therethrough, a means for inducing the flow of said air, an open water container in said compartment having the surface of its water in contact with said air, whereby a normal degree of humidification of said air is produced, an intermittently acting means for supplying additional humidity to said air, an intermittently acting automatic heating means for maintaining the temperature of said water constant for any desired length of time, whereby the normal rate of humidification may be maintained substantially constant and a means for adjusting said automatic heating means for changing the said temperature from time to time whereby to change said normal rate of humidification according to the season of the year and the condition of the weather.

Signed at New York in the county of New York and State of New York this 26th day of June, A. D. 1929.

GIBSON BUTTFIELD.